(12) United States Patent
Nishiyama et al.

(10) Patent No.: US 8,068,313 B2
(45) Date of Patent: Nov. 29, 2011

(54) MICROACTUATOR, HEAD GIMBAL ASSEMBLY, AND DISK DRIVE DEVICE

(75) Inventors: Nobumasa Nishiyama, Kanagawa (JP); Ryo Yoshida, Kanagawa (JP); Haruhide Takahashi, Kanagawa (JP); Shinobu Hagiya, Kanagawa (JP); Toshiki Hirano, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 607 days.

(21) Appl. No.: 12/271,820

(22) Filed: Nov. 14, 2008

(65) Prior Publication Data
US 2009/0135523 A1 May 28, 2009

(30) Foreign Application Priority Data

Nov. 14, 2007 (JP) ................................. 2007-296152

(51) Int. Cl.
*G11B 5/48* (2006.01)

(52) U.S. Cl. ............... 360/245.8; 360/245.9; 360/245.5; 360/294.4; 360/234.5; 360/234.6; 360/234.3; 360/234.7

(58) Field of Classification Search ............... 360/245.8, 360/245.9, 245.4, 294.4, 234.5, 234.6, 234.3, 360/234.7
See application file for complete search history.

(56) References Cited

U.S. PATENT DOCUMENTS

| | | | | |
|---|---|---|---|---|
| 4,789,914 A * | 12/1988 | Ainslie et al. | ............... | 360/234.5 |
| 5,657,186 A * | 8/1997 | Kudo et al. | ................ | 360/234.5 |
| 5,856,895 A * | 1/1999 | Schaenzer et al. | ......... | 360/234.7 |
| 6,008,969 A * | 12/1999 | Imai et al. | ................ | 360/125.35 |
| 6,064,550 A * | 5/2000 | Koganezawa | ............... | 360/294.3 |
| 6,487,045 B1 * | 11/2002 | Yanagisawa | ............... | 360/236.5 |
| 6,587,314 B1 * | 7/2003 | Lille | ............................. | 360/313 |
| 6,617,763 B2 * | 9/2003 | Mita et al. | ...................... | 310/328 |
| 6,618,220 B2 * | 9/2003 | Inagaki et al. | ............. | 360/78.05 |
| 6,817,073 B2 * | 11/2004 | Uchiyama et al. | ........... | 29/25.35 |
| 6,853,517 B2 | 2/2005 | Hirano et al. | | |
| 6,912,760 B2 * | 7/2005 | Uchiyama et al. | ........... | 29/25.35 |
| 7,064,401 B2 * | 6/2006 | Uchiyama et al. | ............ | 257/415 |
| 7,099,115 B2 | 8/2006 | Yao et al. | | |
| 7,183,696 B2 * | 2/2007 | Yamazaki et al. | ............ | 310/328 |
| 7,239,488 B2 * | 7/2007 | Zhu et al. | ...................... | 360/323 |
| 7,242,132 B2 * | 7/2007 | Hida et al. | ...................... | 310/328 |
| 7,345,851 B2 * | 3/2008 | Hirano et al. | ............... | 360/294.4 |
| 7,830,638 B1 * | 11/2010 | Jiang et al. | ................. | 360/234.5 |
| 2006/0044698 A1 | 3/2006 | Hirano et al. | | |
| 2006/0044699 A1 | 3/2006 | Hirano et al. | | |
| 2007/0030601 A1 | 2/2007 | Honda | | |

FOREIGN PATENT DOCUMENTS

| | | |
|---|---|---|
| JP | 2000-215428 | 8/2000 |
| JP | 2003-263851 | 9/2003 |

\* cited by examiner

*Primary Examiner* — Viet Nguyen
(74) *Attorney, Agent, or Firm* — Mahamedi Paradice Kreisman LLP; Christopher J. Brokaw

(57) ABSTRACT

Embodiments of the present invention relate to approaches to effectively let noise on a head slider bonded to a silicon substrate of a microactuator, escape to the ground. A head gimbal assembly (HGA) according to an embodiment of the present invention comprises a microactuator bonded to a gimbal tongue. The microactuator comprises a piezoelectric element and a movable part for moving in response to expansion or contraction of the piezoelectric element. The motion of the movable part causes a head slider to slightly move. The microactuator further comprises a conductive path including an impurity-containing silicon layer formed on the silicon substrate. The conductive path transmits electric charge of the head slider to a suspension. The conductivity of the impurity-containing silicon layer is lower than the one of the silicon substrate so that the noise charge of the head slider may escape to the suspension.

20 Claims, 11 Drawing Sheets

(a)

(b)

MICROACTUATOR, HEAD GIMBAL ASSEMBLY, AND DISK DRIVE DEVICE

CROSS-REFERENCE TO RELATED APPLICATION

The instant nonprovisional patent application claims priority to Japanese Patent Application No. 2007-296152, filed Nov. 14, 2007, and which is incorporated by reference in its entirety herein for all purposes.

BACKGROUND OF THE INVENTION

Disk drive devices using various kinds of recording disks, such as optical disks, magneto-optical disks, flexible magnetic disks, and the like, have been known in the art. In particular, hard disk drives (HDDs) have been widely used as storage devices of computers and have been one of indispensable storage devices for current computer systems. Moreover, the HDDs have found widespread application to moving image recording/reproducing apparatuses, car navigation systems, cellular phones, and the like in addition to the computers, due to their outstanding characteristics.

A magnetic disk used in a HDD has multiple concentric data tracks and servo tracks. Each data track includes a plurality of data sectors containing user data recorded thereon. Each servo track has address information. The servo track consists of a plurality of servo data arranged discretely in the circumferential direction, and one or more data sectors are recorded between servo data. A head element portion accesses a desired data sector in accordance with address information in the servo data to write data to and retrieve data from the data sector.

The head element portion is formed on a slider; the slider is bonded to a suspension of an actuator. The assembly of the actuator and the head slider is called a head stack assembly (HSA) and the assembly of the suspension and the head slider is called a head gimbal assembly (HGA). Pressure caused by air viscosity between an air bearing surface (ABS) of the slider facing a magnetic disk and the spinning magnetic disk balances pressure toward the magnetic disk added by the suspension so that the head slider flies over the magnetic disk with a specific gap. The actuator pivots about a pivotal shaft to move the head slider to a target track and position it onto the track.

As a track per inch (TPI) in the magnetic disk increases, improvement in positioning accuracy of head slider has been required. However, driving the actuator with a voice coil motor (VCM) has found a limit in the positioning accuracy. Therefore, an approach has been proposed that mounts a compact actuator (microactuator) on a tip end of the actuator to achieve a finer positioning (for example, refer to U.S. Patent Application Publication No. 2006/044698).

A magnetic disk is charged by external electromagnetic waves or noise generated by a spindle motor. Since the magnetic disk and a head slider have capacitance therebetween, electric charge is induced to the head slider at a high frequency. In order to avoid a head element portion from being damaged by electrostatic discharge (ESD) from the head slider, it is necessary that the slider body of the head slider be grounded. If the head slider is bonded to a microactuator, it is necessary that the head slider be grounded through the microactuator (for example, refer to Japanese Unexamined Patent Application Publication No. 2004-247027).

BRIEF SUMMARY OF THE INVENTION

Embodiments of the present invention relate to approaches to effectively let noise on a head slider bonded to a silicon substrate of a microactuator, escape to the ground. As shown in FIG. 8, a head gimbal assembly (HGA) according to an embodiment of the present invention comprises a microactuator 205 bonded to a gimbal tongue 224. The microactuator 205 comprises a piezoelectric element 255 and a movable part for moving in response to expansion or contraction of the piezoelectric element. The motion of the movable part causes a head slider 105 to slightly move. The microactuator further comprises a conductive path including an impurity-containing silicon layer 551 formed on the silicon substrate 253. The conductive path transmits electric charge of the head slider 105 to a suspension 110. The conductivity of the impurity-containing silicon layer 551 is lower than the one of the silicon substrate 253 so that the noise charge of the head slider may escape to the suspension.

DETAILED DESCRIPTION OF THE INVENTION

Figure 1:
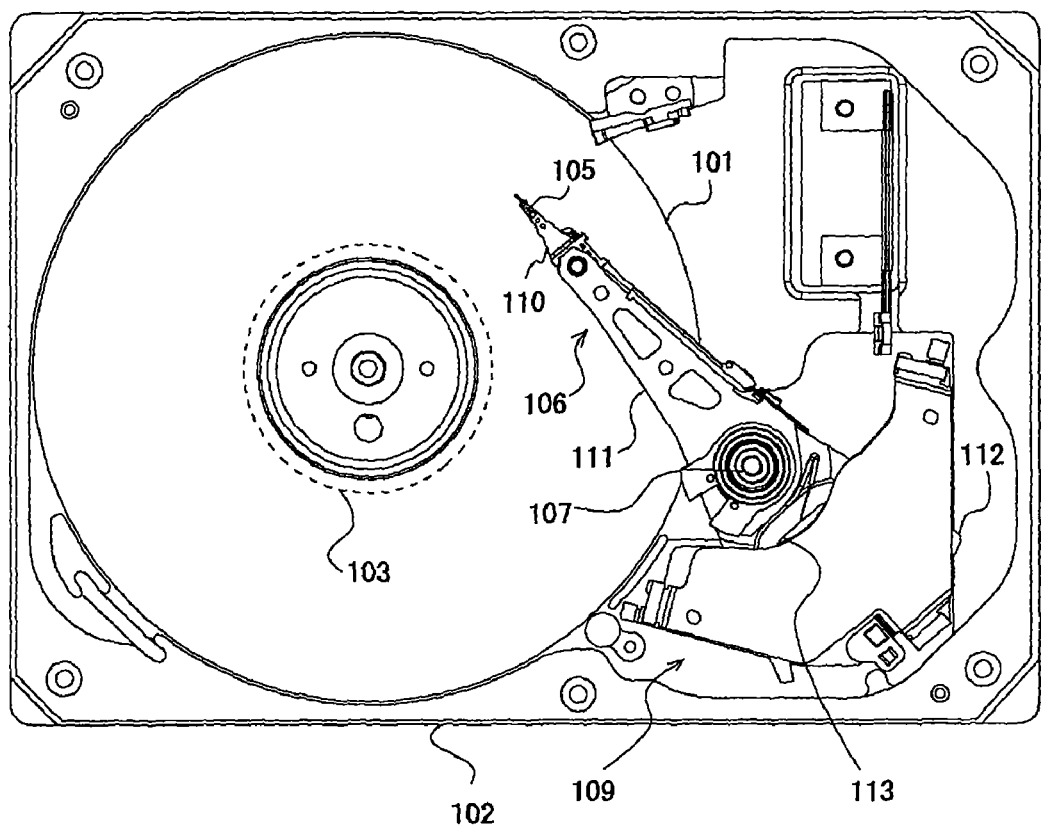
FIG. 1 is an exemplary plan view depicting a HDD according to an embodiment without a cover of an enclosure.

In various structures proposed for a microactuator, a microactuator comprising a micro electromechanical system (MEMS), which directly moves a head slider slightly as disclosed above, is advantageous to improve positioning property for a head slider because of a large displacement amount and a high resonance frequency. The substrate of the MEMS is made of silicone for the purpose of its process. Silicon has approximately 2.52E-4 [S/m] of electrical conductivity, and a necessary and sufficient resistance to prevent ESD.

On the other hand, as the TPI and bit per inch (BPI) increase and the head element portion becomes miniaturized, the output signal level of the head element portion becomes lower. Therefore, the head element portion tends to be affected by noise. The noise induced from a magnetic disk to a head slider enters the reproducing system in the head element portion to significantly affect reproducing signals. In order to prevent generation of this noise, it is effective to let the noise from the head slider escape swiftly to a suspension through a ground line.

As described above, the conductivity of silicon is sufficiently high to prevent ESD. However, the conductivity is not high enough to let the noise induced to the head slider escape to the ground level. Accordingly, in a microactuator having a silicon substrate to which a head slider is bonded, it may be useful to have a structure that lets the induced noise in the head slider escape to the suspension to maintain the head slider at the ground potential at any time.

Embodiments in accordance with the present invention relate to a microactuator, a head gimbal assembly, and a disk drive device, more particularly to grounding a head slider bonded to a microactuator A head gimbal assembly according to an embodiment of the present invention comprises a suspension, a silicon substrate bonded to the suspension and having a movable part and a stationary part, a piezoelectric element bonded to the silicon substrate, a head slider bonded to the movable part, a conductive path formed on the silicon substrate, having conductivity higher than the silicon substrate and for transmitting electric charge of the head slider, and a conductive stud formed on the suspension and being in contact with the conductive path on the silicon substrate on a side of the suspension reverse to a head slider mounting surface on which the head slider is mounted. The conductive path enables noise on the head slider bonded to the silicon substrate of the microactuator to effectively escape to the suspension.

The conductive path may comprise an impurity-containing silicon layer. This accomplishes the conductive path formed without disturbing the motion of the silicon substrate. Moreover, the conductive path may comprise an impurity-containing silicon layer extending from the movable part to the stationary part on the slider mounting surface.

The conductive path may comprise a penetrating path extending from the head slider mounting surface to the reverse side through the silicon substrate. This avoids the wiring on the silicon substrate and accomplishes more efficient manufacturing of the microactuator. The conductive path may comprise an impurity-containing silicon layer extending and joining to the penetrating path on the slider mounting surface. This accomplishes reduction in influence to the movable part. The silicon substrate may comprise a plurality of through-holes, and the conductive path comprises penetrating paths passing through the plurality of through-holes, respectively. This accomplishes reduction in influence to the movable part.

The silicon substrate may comprise a through-hole, and the penetrating path penetrates the through-hole. Providing the conductive layer in the through-hole leads to forming a part of the conductive path easily. The penetrating path comprises a metallic layer deposited inside the through-hole to increase the conductivity. Or, the penetrating path comprises an impurity-containing silicon layer provided on the inner surface of the through-hole to increase the manufacturing efficiency. The through-hole may be provided in the stationary part. This prevents the through-hole from disturbing the motion of the movable part.

A microactuator according to another embodiment of the present invention comprises a silicon substrate having a stationary part to be bonded to a suspension and a movable part to which a head slider is to be bonded, a piezoelectric element fixed on the silicon substrate for moving the movable part, and a conductive path formed on the silicon substrate, having conductivity higher than the silicon substrate, and extending from a head slider mounting surface on which the head slider is mounted to the reverse side thereto. The conductive path enables noise on the head slider bonded to the silicon substrate of the microactuator to effectively escape to the suspension.

A disk drive device according to yet another embodiment of the present invention comprises an enclosure, a motor mounted in the enclosure for spinning a disk, a head slider for accessing the disk, and an actuator for supporting the head slider and moving the head slider over the disk in a radial direction thereof. The actuator comprises a suspension having a conductive stud, and a microactuator having a head slider mounting surface on which the head slider is mounted and fixed to the suspension in contact with the conductive stud on a side reverse to the head slider mounting surface. The microactuator comprises a silicon substrate including a movable part to which the head slider is bonded, and a stationary part bonded to the suspension in contact with the conductive stud, a piezoelectric element bonded to the silicon substrate and for moving the movable part, and a conductive path formed on the silicon substrate and having conductivity higher than the silicon substrate for transmitting electric charge of the head slider. The conductive path enables noise on the head slider bonded to the silicon substrate of the microactuator to effectively escape to the suspension.

Embodiments of the present invention allow noise on a head slider bonded on a silicon substrate of a microactuator to effectively escape to the ground.

Hereinafter, an embodiment of the present invention will be described. For clarity of explanation, the following description and the accompanying drawings contains simplifications as appropriate. Throughout the drawings, like components are denoted by like reference numerals, and their repetitive description is omitted if not necessary for clarity of explanation. In this particular embodiment, descriptions are given to a hard disk drive (HDD) as an example of a disk drive device.

A head gimbal assembly (HGA) to be mounted on an HDD according to the present embodiment, comprises a microactuator in addition to a suspension and a head slider. The microactuator of the present embodiment comprises a micro electro mechanical system (MEMS) and a silicon substrate including a movable part. A piezoelectric element is bonded to the silicon substrate and the movable part of the silicon substrate moves in response to expansion and contraction of the piezoelectric element. A head slider is bonded to the movable part. The motion of the movable part causes the head slider to slightly move, which enables fine positioning of the head slider.

The microactuator of the present embodiment comprises a conductive path formed on the silicon substrate. This conductive path transmits the electric charge of the head slider to a suspension. The conductive path has a higher conductivity than the silicon substrate so that the noise charge of the head slider may escape to the suspension swiftly. This prevents the electrostatic discharge (ESD) damage of the head element portion and effectively suppresses noise mixing to a reproducing system.

Before describing the head gimbal assembly (HGA) according to an embodiment, an entire configuration of an HDD will be outlined referring to FIG. 1. Mechanical components in the HDD 1 are housed in a base 102; operation of the components in the base 102 is controlled by a control circuit (not shown) on a circuit board fixed outside the base. The HDD 1 comprises a magnetic disk 101 of a disk for storing data, a head slider 105 for accessing (read or write) the magnetic disk 101. The head slider 105 comprises a head element portion for reading user data from and/or writing user data to the magnetic disk 101 and a slider on which the head element portion is formed.

An actuator 106 supports the head slider 105. The actuator 106 pivots about a pivotal shaft 107 to move the head slider 105 above the spinning magnetic disk 101 in order to access the magnetic disk 101. A voice coil motor (VCM) 109 as a driving mechanism drives the actuator 106. The assembly of the actuator 106 and the VCM 109 is a moving mechanism of the head slider 105. The actuator 106 comprises components of a suspension 110, an arm 111, a coil support 112, and a VCM coil 113 coupled in the longitudinal direction in order from the tip end where the head slider 105 is disposed.

A spindle motor (SPM) 103 fixed to the base 102 spins the magnetic disk 101 at a specific angular rate. Pressure caused by air viscosity between an air bearing surface (ABS) of the slider facing the magnetic disk 101 and the spinning magnetic disk 101 balances the pressure in the direction toward the magnetic disk 101 applied by the suspension 110 so that the head slider 105 flies above the magnetic disk 101.

Figure 2:
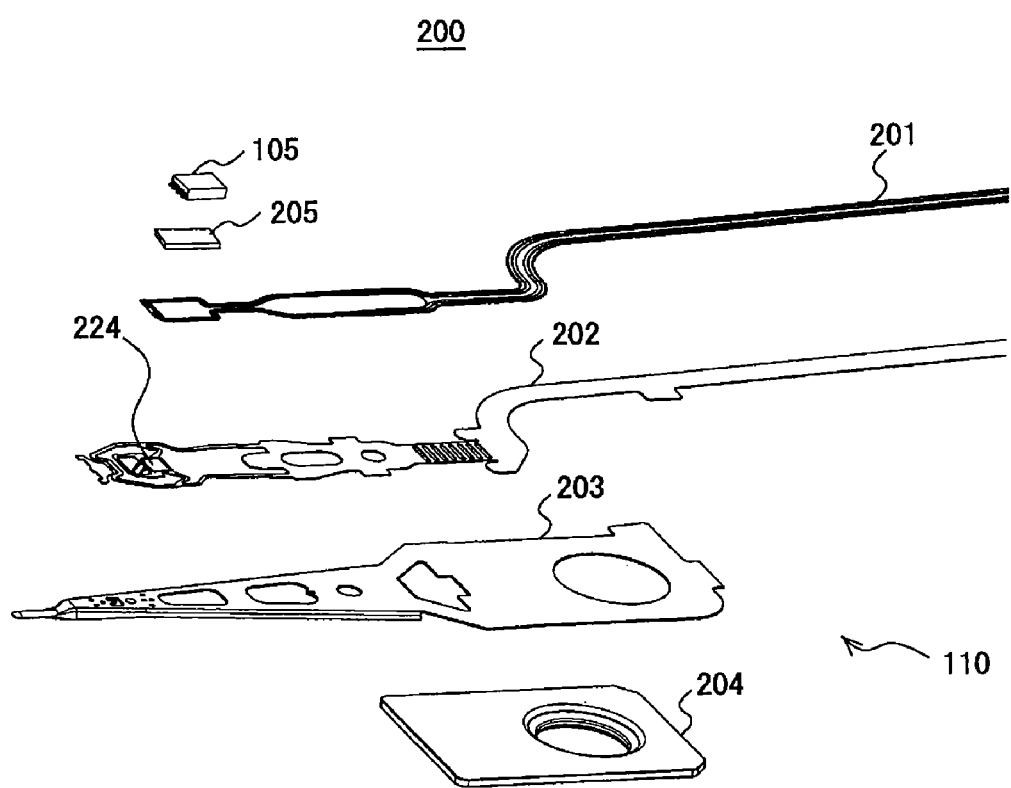
FIG. 2 is an exemplary exploded perspective view illustrating components of an HGA according to an embodiment.

FIG. 2 is an exploded perspective view showing components of an HGA 200 according to the present embodiment. The HGA 200 comprises a suspension 110, a microactuator 205, and a head slider 105. The suspension 110 comprises a flex cable 201, a gimbal 202, a load beam 203, and a mount plate 204. The load beam 203 is made of stainless steel or the like as a precision leaf spring. Its rigidity is higher than the one of the gimbal 202. The spring properties of the load beam 203 cause a load to the head slider 105.

The mount plate 204 and the gimbal 202 are made of stainless steel, for example. The gimbal 202 has a gimbal tongue 224 on which the microactuator 205 and the head slider 105 are fixed. The gimbal tongue 224, which is supported elastically, holds the microactuator 205 and the head slider 105 and contributes to tilt control of the head slider 105 by tilting freely. Terminals on one end of the flex cable 201 are connected to the microactuator 205 and the head slider 105 and terminals on the other end are connected to a substrate fixed to the actuator 106. The flex cable 201 carries control signals for controlling the microactuator 205 as well as read signals and write signals.

Figure 3:
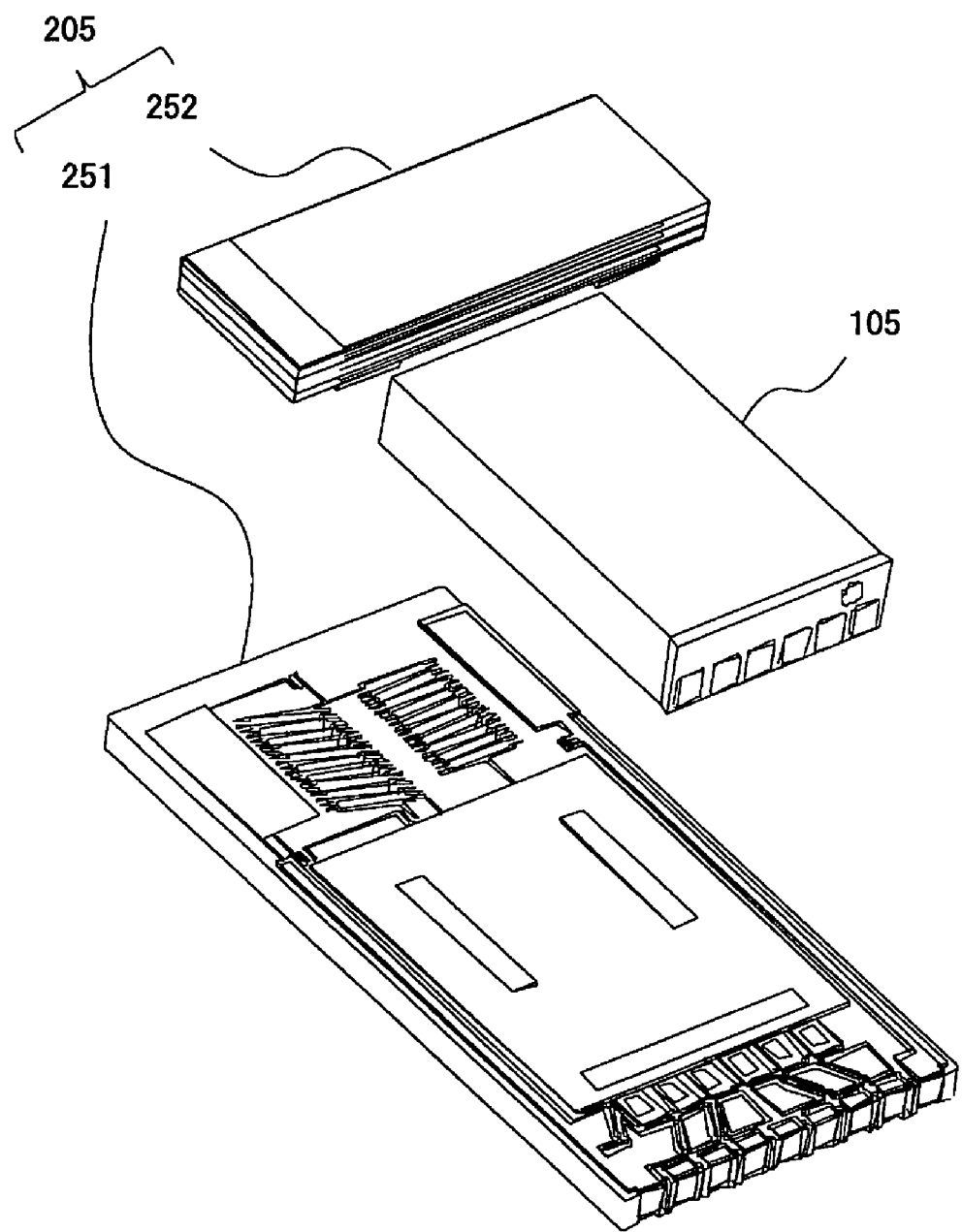
FIG. 3 is an exemplary exploded perspective view schematically depicting a structure of a microactuator and a head slider according to an embodiment.

FIG. 3 is an exploded perspective view schematically illustrating the structure of the microactuator 205 according to the present embodiment. The microactuator 205 is constituted by an MEMS 251 and a piezoelectric element 252. The piezoelectric element 252 is bonded on the same surface of the MEMS 251 as the head slider 105. In this embodiment, the piezoelectric element 252 is bonded on the disk-facing surface of the MEMS 251 at the leading side of the head slider 105.

Figure 4:
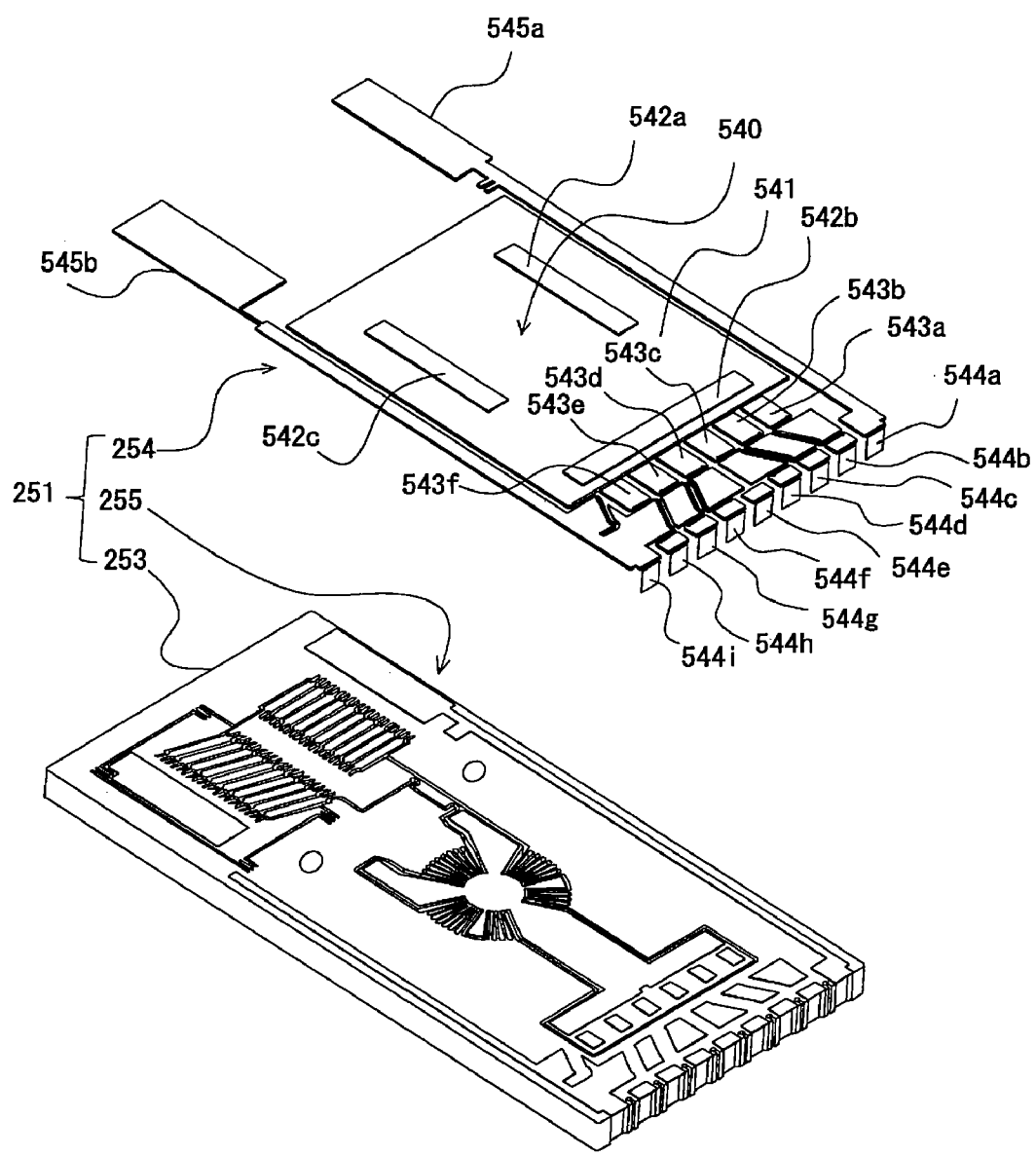
FIG. 4 is an exemplary exploded perspective view schematically depicting a structure of an MEMS of the microactuator according to an embodiment.

FIG. 4 is an exploded perspective view schematically illustrating the structure of the MEMS 251. The MEMS 251 comprises a silicon substrate 253 and a metallic layer 254 formed on the silicon substrate 253 by plating or sputtering. The metallic layer 254 is typically made of gold. An underlayer 255 is formed between the silicon substrate 253 and the metallic layer 254 by plating or sputtering. The underlayer 255 is typically made of the same metal as the metallic layer 254. The metallic layer 254 is constituted by a plurality of parts. A platform 540 has studs 542a to 542c on its main plate 541. The head slider 105 is bonded onto the platform 540 with adhesives in contact with these studs 542a to 542c. The platform 540 comprises a part of a conductive path to ground the head slider 105. This will be described later.

Connection pads 543a to 543f are electrically connected to connection pads of the head slider 105 and transmit signals to elements like a head element portion. Connection pads 544a to 544i are electrically connected to connection pads of a flex cable 201. The piezoelectric element 252 is bonded onto pads 545a and 545b and is also electrically connected to the pads 545a and 545b. The connection pads 545a and 545b are electrically connected to the connection pads 544a and 544i, respectively. Signals transmitted via the flex cable 201, the connection pads 544a and 544i, and the connection pads 545a and 545b expand and contract the piezoelectric element 252.

The silicon substrate 253 has a movable part and a stationary part. The movable part moves in response to expansion and contraction of the piezoelectric element 252. On the other hand, the stationary part does not substantially move even if the piezoelectric element 252 expands and contracts. The silicon substrate 253 is etched to form the movable part. The platform 540 is fixed on a part of the movable part of the silicon substrate 253 and rotates in response to movement of the movable part. The head slider 105 on the platform 540 also rotates with the rotation of the platform 540, which leads to fine positioning of the head element portion to a target track (target position). The rotation amount is a little and the motion of the head slider 105 by the microactuator 205 is slight.

Figure 5:
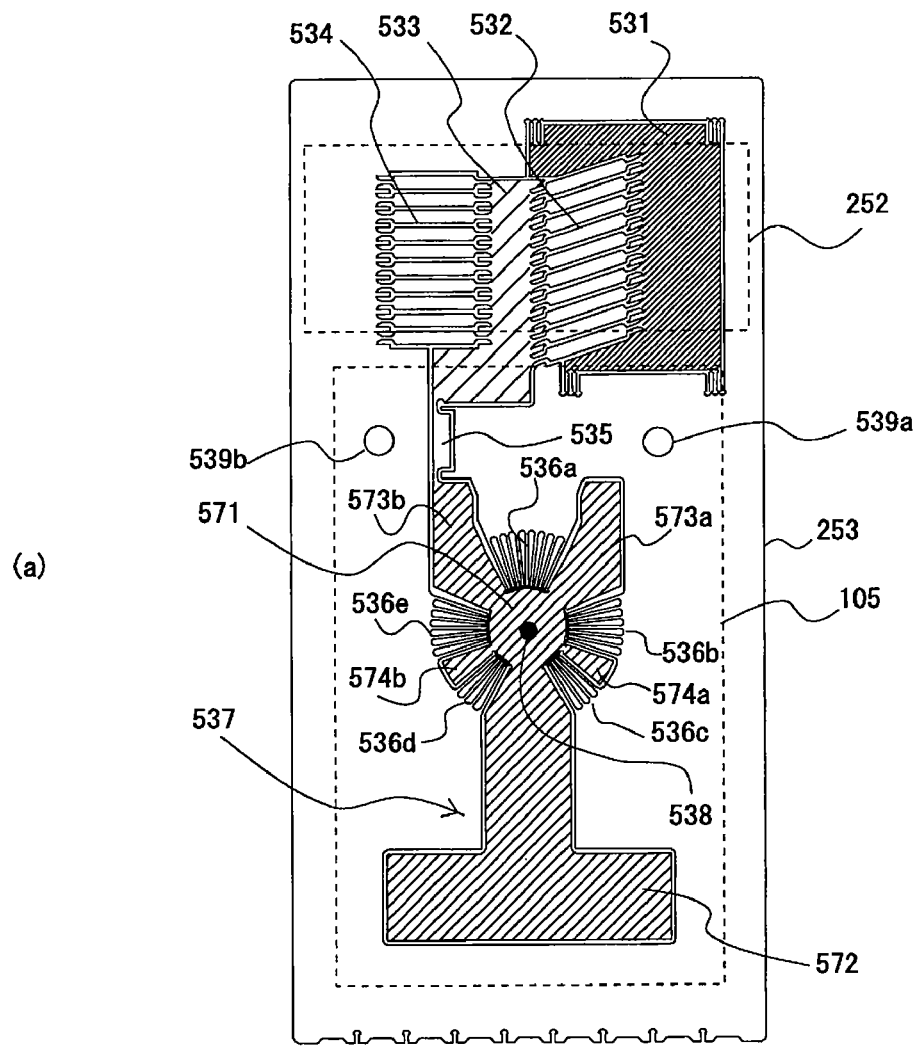
FIG. 5 are views schematically depicting a structure of a silicon substrate of the MEMS according to an embodiment.
Figure 5:
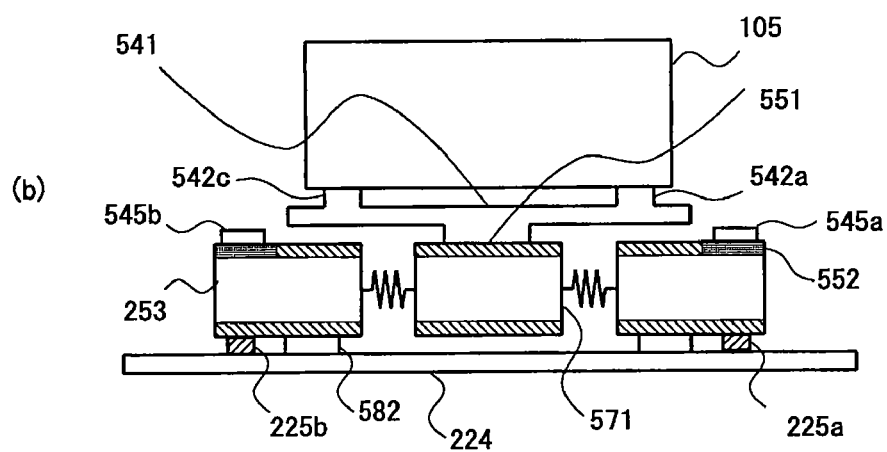

Next, referring to FIGS. 5(a) and 5(b), the structure of the silicon substrate 253 will be described in detail. FIG. 5(a) is a plan view schematically showing the appearance of the bottom surface of the silicon substrate 253. The bottom surface of the silicon substrate 253 is a surface to be bonded onto the gimbal tongue 224 and a side reverse to the mounting surface of the head slider 105. In FIG. 5(a), the head slider 105 and the piezoelectric element 252 placed on the mounting surface are indicated in dotted lines. FIG. 5(b) is a cross-sectional view schematically illustrating the microactuator 205 bonded to the gimbal tongue 224 and the head slider 105 on the microactuator 205.

As illustrated in FIG. 5(a), the silicon substrate 253 comprises a movable part formed by etching. The silicon substrate 253 is deformed in response to expansion and contraction of the piezoelectric element 252 so that the head slider 105 rotates. The silicon substrate 253 has through-holes 539a and 539b on its stationary part. The through-holes 539a and 539b comprise a part of the conductive path for the head slider 105 to ground to the suspension 110. This will be described later.

The movable part includes a plurality of parts showing different movement and having different functions. Specifically, the movable part includes a driving part 531, a first translational spring mechanism 532, a translational part 533, a second translational spring mechanism 534, a transformation part 535, a first to a fifth rotational spring mechanisms 536a to 536e, and a rotational part 537. The rotational part 537 includes a circular part 571 including the rotational center 538, a T-shaped part 572, two wing-shaped parts 573a and 573b, and two fan-shaped parts 574a and 574b.

The driving part 531 is attached to the piezoelectric element 252 and shows the similar movement to the expansion and contraction of the piezoelectric element 252. The driving part 531 is coupled to the translational part 533 by the first translational spring mechanism 532. The first translational spring mechanism 532 is directly coupled to the driving part 531 and the translational part 533. The translational part 533 is disposed between the first translational spring mechanism 532 and the second translational spring mechanism 534 and is directly coupled to them. The translational part 533 is further coupled to the rotational part 537 by the transformation part 535. The rotational part 537 is directly coupled to each of the first to the fifth rotational spring mechanisms 536a to 536e. The rotational part 537 rotates about the rotational center 538.

The first to the fifth rotational spring mechanisms 536a to 536e are provided around the pivotal center 538 so as to draw a circle and each of them is discrete in the circumferential direction. Parts of the rotational part 537 exist between each of the first to the fifth rotational spring mechanism 536a to 536e. The rotational part 537 has the circular part 571 including the rotational center 538, the T-shaped part 572, two wing-shaped parts 573a and 573b, and two fan-shaped parts 574a and 574b. They are formed continuously, and integrally constitute the rotational part 537. The T-shaped part 572 is located on the trailing side of the circular part 571 and the two wing-shaped parts 573a and 573b are located on the leading side of the circular part 571. The wing-shaped part 574a is located between the second rotational spring mechanism 536b and the third rotational spring mechanism 536c, and the wing-shaped part 574b is located between the fourth rotational spring mechanism 536d and the fifth rotational sprig mechanism 536e. The part other than the movable part is the stationary part.

As shown in FIG. 5(b), a main plate 541 of the platform 540 is bonded to the rotational part 537, a part of the movable part, and is suspended away from the stationary part. The part which does not disturb the motion of the movable part within the stationary part of the silicon substrate 253 is bonded to the gimbal tongue 224 with adhesives 582. The rotational part 537 is linked to the stationary part by the spring mechanisms. The rotational part 537 rotates with respect to the stationary part and the gimbal tongue 224. The main plate 541 of the platform 540 bonded to the rotational part 537 and the head slider 105 rotates like the rotational part 537. The parts denoted by the other reference numerals in FIG. 5(b) will be described later.

Figure 6:
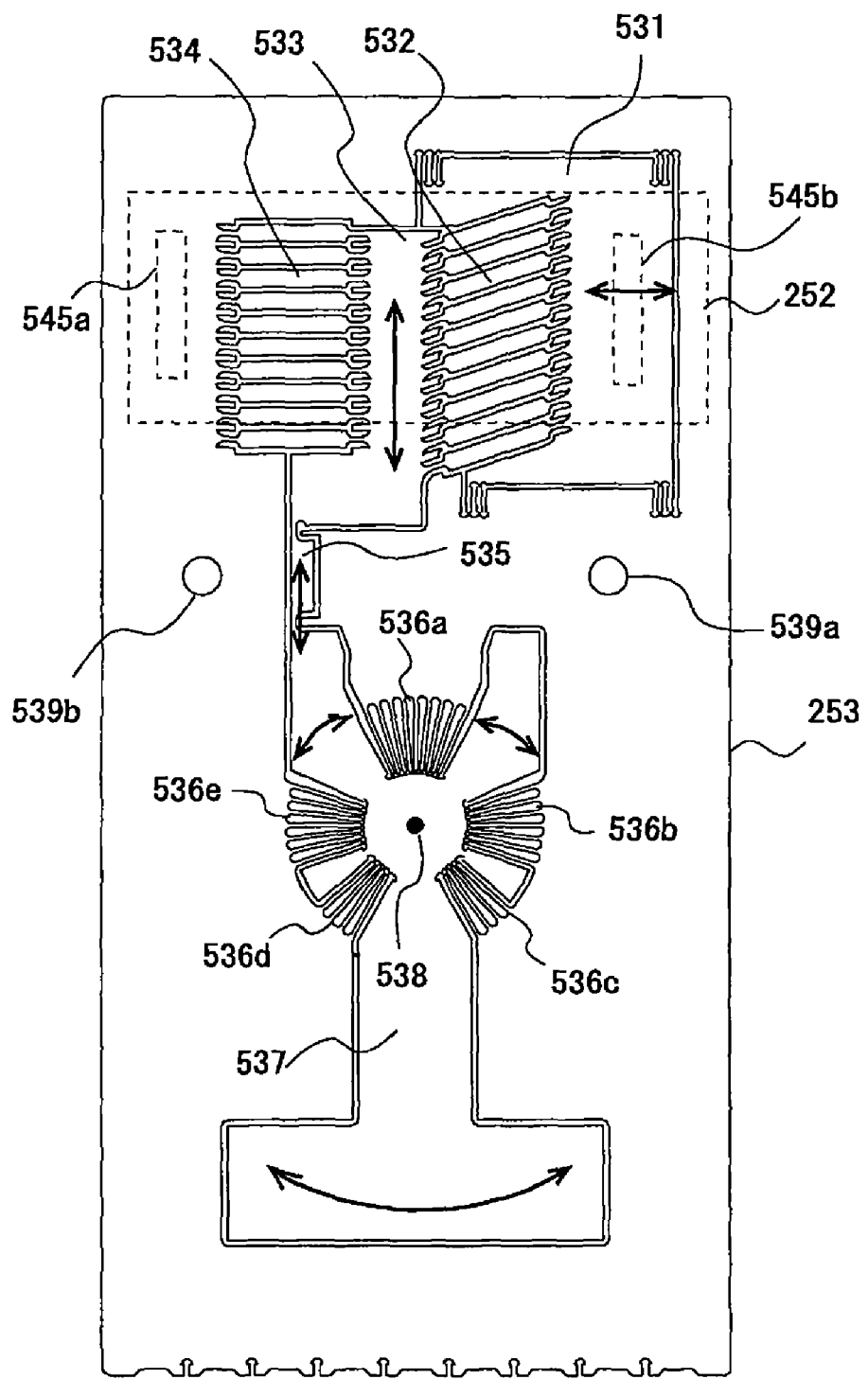
FIG. 6 is a drawing schematically depicting the motion of the silicon substrate of the MEMS according to an embodiment.

Now referring to FIG. 6, the motion of the silicon substrate 253 will be described. In FIG. 6, each arrow indicates motion at a corresponding part. A connection pad 545a, one of the connection pads 545a and 545b for the piezoelectric element 252, is located on the stationary part of the silicon substrate 253 and the other one 545b is located on the driving part 531. When the piezoelectric element 252 expands and contracts in the radial direction of the disk (the right-left direction of FIG. 6) within the plane of the silicon substrate 253, the connection pad 545b and the driving part 531 are displaced. The connection pad 545a remains stationary. Typically, a given bias voltage is applied to the piezoelectric element 252 and the applied voltage is increased or decreased by reference to the voltage.

With motion of the driving part 531, the first translational spring mechanism 532 is deformed. The first translational spring mechanism 532 is constituted by a plurality of tilted beams and functions to amplify the motion of the driving part 531. In response to the motion of the first translational spring mechanism 532, the translational part 533 translates back and forth in the circumferential direction of the disk (the top-bottom direction of FIG. 6). The second translational spring mechanism 534 constituted by a plurality of parallel beams expands and contracts in the same direction as the first translational spring mechanism 532 in response to the motion of the translational part 533.

The displacement of the translational part 533 is transferred to the transformation part 535, which transfers the displacement of the translational part 533 to the rotational part 537. The transformation part 535 shows motion of a mixture of translation and rotation, and the displacement within the movable part is transformed from translation into rotation at the transformation part 535. The rotational part 537 rotates about the rotational center 538. Simultaneously, the first to the fifth rotational spring mechanisms 536a to 536e expand and contract with the motion of the rotational part 537. Through these operations, the expansion and contraction of the piezoelectric element 252 rotates the head slider 105 in both radial directions of the disk (the orthogonal directions to tracks) to perform fine positioning of the head element portion.

Figure 7:
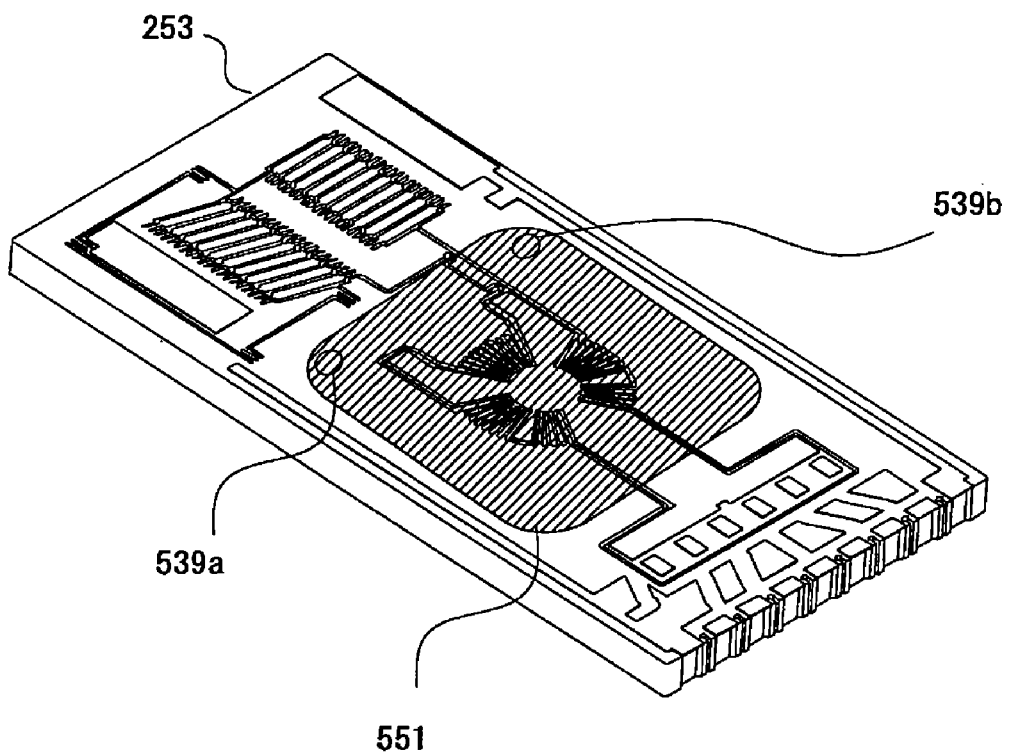
FIG. 7 is a drawing schematically depicting an impurity-containing silicon layer provided on the silicon substrate of the MEMS according to an embodiment.

Hereinafter, a feature of the present embodiment, namely a configuration for grounding a head slider 105, will be described. As shown in FIG. 7, an impurity-containing silicon layer 551 is provided on a silicon substrate 253 of the MEMS 251. Typically, the impurity-containing silicon layer 551 is formed by doping another element as impurity on the surface of the silicon substrate 253. The element may be boron or phosphorus having different number of valence electrons from silicon and the conductivity of the impurity-containing silicon layer 551 is higher than silicon. FIG. 7 shows the impurity-containing silicon layer 551 provided on the mounting surface for a head slider 105. In the present embodiment, the impurity-containing silicon layer 551 is provided on a side reverse to the head slider mounting surface, too. The impurity-containing silicon layer 551 constitutes a part of a conductive path for grounding the head slider 105 to the suspension 110.

FIG. 8(a) is a plan view schematically depicting the appearance of the underside of the silicon substrate 253 and the impurity-containing silicon layer 551 provided on its reverse side. FIG. 8(b) is a cross-sectional view schematically depicting a microactuator 205 bonded to a gimbal tongue 224 and a head slider 105 thereon. These correspond to FIGS. 5(a) and 5(b), respectively. As shown in FIG. 8(b), the head slider 105 is in contact with studs 542a to 542c on the platform 540. If the head slider 105 is bonded with adhesives on the studs 542a to 542c, the head slider 105 is prevented from tilting.

The studs 542a to 542c are parts of a metallic layer 254 of the MEMS 251 and are conductive studs made of metal. The noise charge of the head slider 105 flows from the studs 542a to 542c into a platform 540. The platform 540 is connected to a rotational circular part 571, which is a part of the movable part of the silicon substrate 253. On the surfaces of the circular part 571, the impurity-containing silicon layer 551 is provided. The platform 540 is in contact with the impurity-containing silicon layer 551 and the noise charge of the platform 540 flows into the impurity-containing silicon layer 551. The impurity-containing silicon layer 551 has a high conductivity enough to transmit the noise charge to the ground level. Preferably, the conductivity is 1E5 [S/m] or more, and more preferably, 3.00E6 [S/m] or more.

As shown in FIG. 8(a), the impurity-containing silicon layer 551 is spread over from the rotational part 537 to the stationary part around it. The rotational part 537 is linked to the stationary part by the spring mechanisms 536a to 536e. The impurity-containing silicon layer 551 is formed on the spring mechanisms 536a to 536e as well. Accordingly, the noise charge flows from the impurity-containing silicon layer 551 on the rotational part 537 to the impurity-containing silicon layer 551 on the stationary part via the impurity-containing silicon layer 551 on the spring mechanisms 536a to 536e. The impurity-containing silicon layer 551 extends to the through-holes 539a and 539b of the stationary part. A conductive layer is formed on the inner surfaces of the through-holes 539a and 539b to transmit the noise charge. The through-holes 539a and 539b will be described in detail later.

As shown in FIG. 8(b), the impurity-containing silicon layer 551 is provided on the surface of the silicon substrate 253 facing the gimbal tongue 224 (hereinafter referred to as a reverse side, too). Typically, as shown in FIG. 8(b), the impurity-containing silicon layer 551 is provided on all over the surface which is bonded to the gimbal tongue 224. The conductive layer of the through-holes 539*a* and 539*b* is connected the impurity-containing silicon layer 551 on the reverse side of the silicon substrate 253. Consequently, the noise charge flows from the inner metallic layer of the through-holes 539*a* and 539*b* to the impurity-containing silicon layer 551 on the reverse side of the silicon substrate 253.

The silicon substrate 253 is in contact with conductive studs 225*a* and 225*b* of the gimbal tongue 224 on its reverse side. Bonding the MEMS 251 to the gimbal tongue 224 via conductive studs 225*a* and 225*b* with adhesive prevents the MEMS 251 from tilting. The surfaces of the conductive studs 225*a* and 225*b* are made of metal. Therefore, the noise charge flows from the impurity-containing silicon layer 551 on the reverse side of the silicon substrate 253 to the entire suspension 110 via the conductive studs 225*a* and 225*b*.

As described above, the head slider 105 is grounded to the suspension 110 via the conductive path of the MEMS 251. That is, the noise charge induced by the head slider 105 flows to the suspension 110 via the conductive path of the MEMS 221. In the above example, the platform 540, the impurity-containing silicon layer 551, the inner conductive layer of the through-holes 539*a* and 539*b* constitute the conductive path.

The conductive path extending from the movable part of the silicon substrate 253 to the stationary part may be formed by depositing a metallic layer instead of using the impurity-containing silicon layer 551. Since the conductivity of the metallic layer is higher than the impurity-containing silicon layer 551, the metallic layer is preferable in the point of grounding. However, the metallic layer formed for the conductive path, especially the metallic layer formed on the spring mechanisms, may be a cause to interfere with the motion of the spring mechanisms. Therefore, the impurity-containing silicon layer 551 may comprise a part of the conductive path extending from the movable part to the stationary part. The conductive path formed by changing the property of the silicon substrate 253 in this way may prevent interference with the motion of the movable part of the silicon substrate 253.

Figure 8:
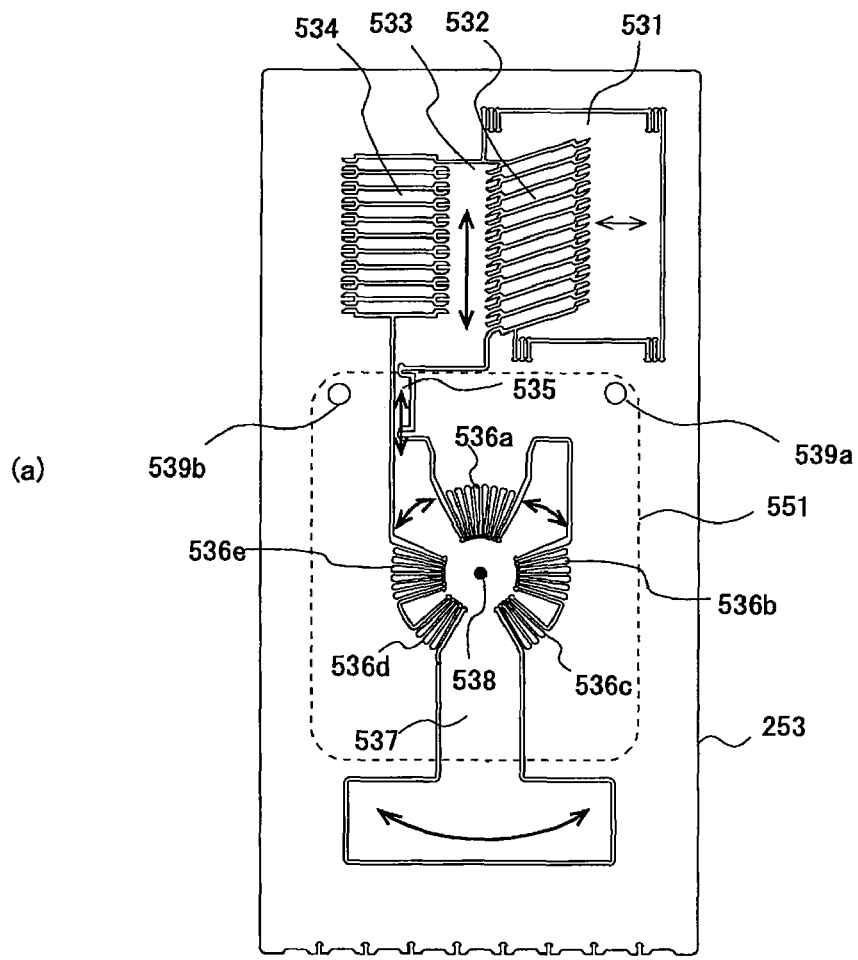
FIG. 8 are drawings schematically illustrating a grounding structure of the silicon substrate of the MEMS according to an embodiment.
Figure 8:
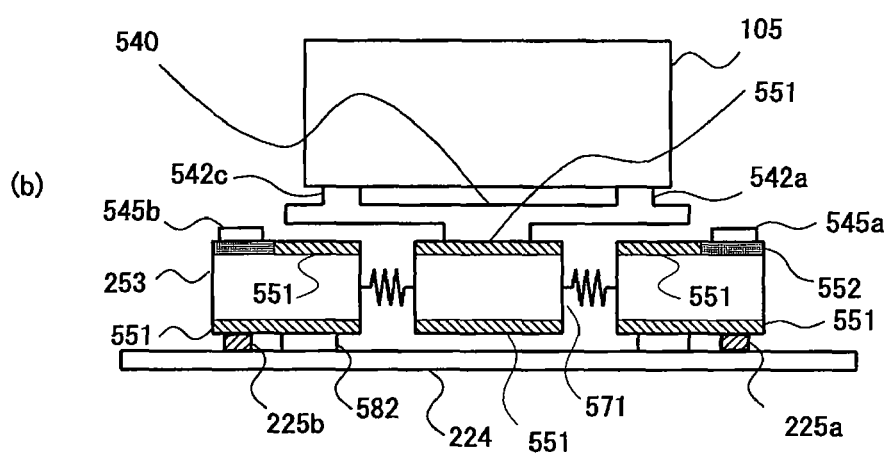

As explained in reference to FIG. 4, a metallic layer 254 is formed on the silicon substrate 253 and a part of the components of the metallic layer 254 transmit signals. Since it is necessary that the components for signal transmission be insulated from each other, it is necessary to form the impurity-containing silicon layer 551 to avoid and not to contact them. FIG. 8(*b*) exemplifies connection pads 545*a* and 545*b* of the piezoelectric element 252. An insulating layer 552 is provided thereunder and the impurity-containing silicon layer 551 is insulated from the silicon substrate 253 and the other part of the metallic layer. The insulating layer 552 is typically made of silicon oxide. In FIG. 8(*b*), a metallic underlayer 255 is omitted, which is the same hereinafter.

The insulating layer 552 may be made easily by oxidizing the silicon substrate 253. However, the insulating layer 552 cannot be made by oxidizing a doped silicon substrate. It is possible to newly laminate an insulating layer 552 but it is not preferable from the view point of the manufacturing efficiency. On the other hand, the conductive path to ground the head slider 105 extends to the side reverse to the head slider mounting surface and contacts the conductive studs 225*a* and 225*b* on the gimbal tongue 224. To this end, in the above example, through-holes 539*a* and 539*b* are provided on the silicon substrate 253 and the conductive layer inside the through-holes 539*a* and 539*b* constitutes a part of the noise charge conductive path. In this way, the conductive path may be formed easily, avoiding the wiring metallic layer on the silicon substrate 253.

Figure 9:
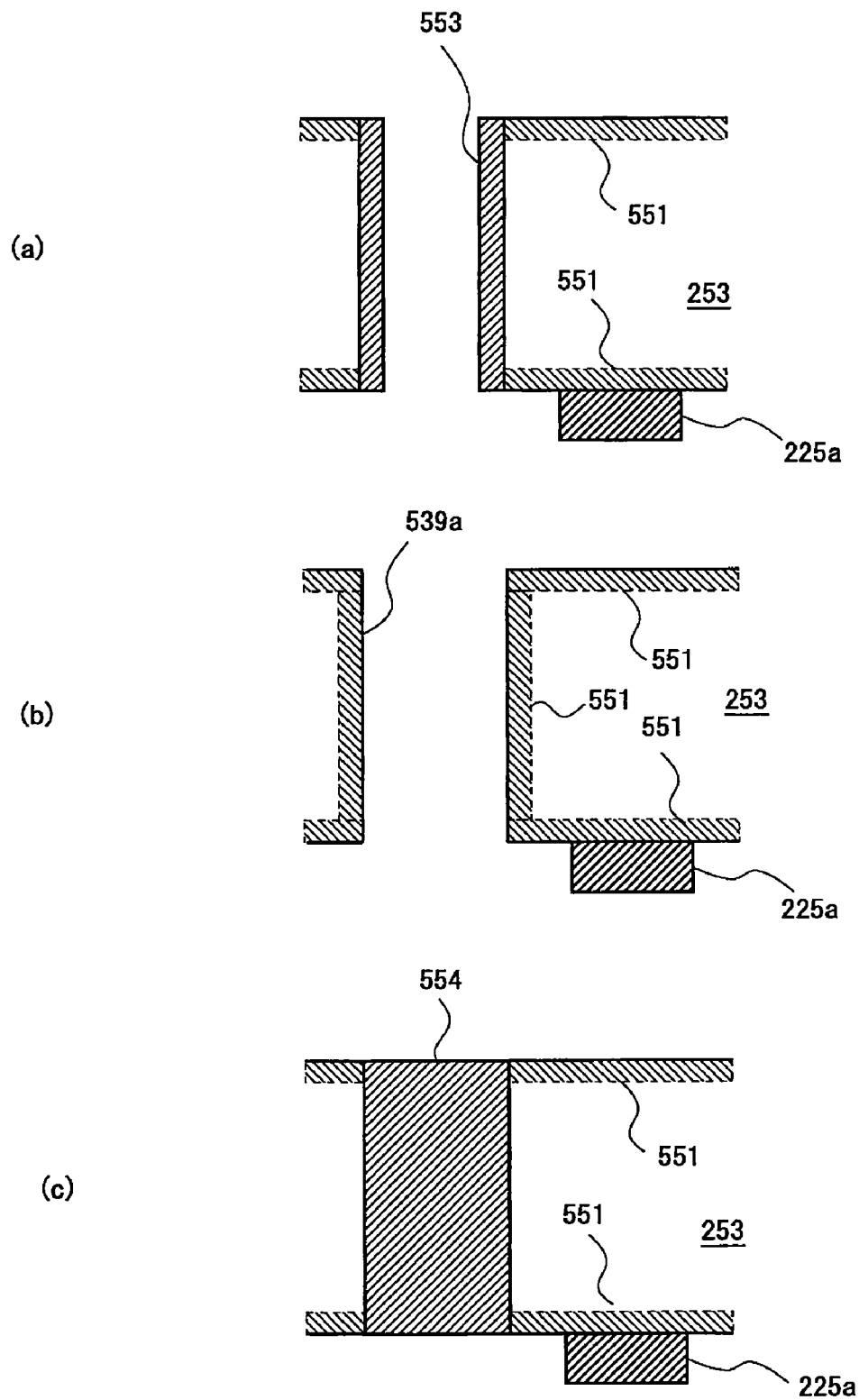
FIG. 9 are drawings schematically illustrating structures of a through-hole of the silicon substrate of the MEMS according to an embodiment.

Next, the structure inside the through-holes 539*a* and 539*b* will be described referring to FIGS. 9(*a*) to 9(*c*). The through-holes 539*a* and 539*b* have the same structure and the following description will be given to the through-hole 539*a*. As described above, a conductive material is present inside the through-holes 539*a* and 539*b* to transmit noise charge. FIG. 9(*a*) shows an example in which a metallic layer 553 is formed inside the through-hole 539*a*. Typically, the metallic layer is a copper layer or a gold layer and may be formed by plating or sputtering. The metallic layer 553 contacts the impurity-containing silicon 551 on the both sides of the silicon substrate 253 to connect them electrically.

In another example shown in FIG. 9(*b*), a conductive layer inside the through-hole 539*a* may be formed by doping another element on the through-hole 539*a* to form an impurity-containing silicon layer 551. This method may increase manufacturing efficiency comparing to the case of depositing a metallic layer. FIG. 9(*c*) shows an example in which the through-hole 539*a* is filled with a metal 554. Copper or gold may be used for the metal 554 as well as for the metallic layer 553. In another example, the impurity-containing silicon layer 551 may be formed to penetrate the silicon substrate 253 instead of providing the through-holes 539*a* and 539*b*, if possible in process.

The through-holes 539*a* and 539*b* may be formed on the stationary part in order to avoid interference with the motion of the movable part. A through-hole with a large diameter is likely to affect the motion of the movable part so a plurality of through-holes may be provided. Furthermore, the positions of the through-holes may be symmetrical with the center line passing the rotational center 538 in the flying direction (the top-bottom direction in FIG. 8(*a*)).

Figure 10:
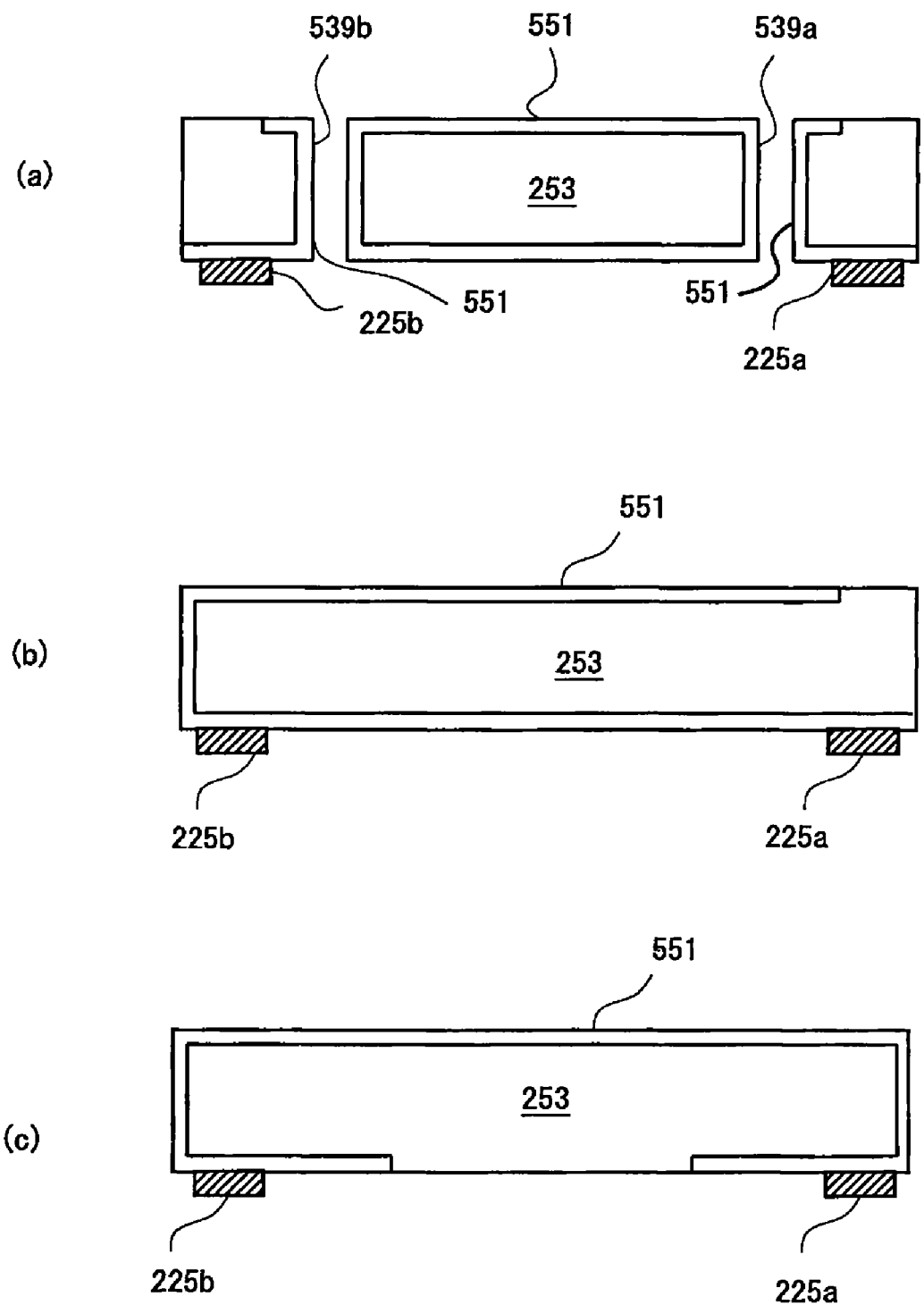
FIG. 10 are drawings schematically illustrating structures of impurity-containing silicon layers of the silicon substrate of the MEMS according to an embodiment.

FIGS. 10(*a*) to 10(*c*) are cross-sectional views schematically illustrating some examples of the impurity-containing silicon layer 551. FIG. 10(*a*) illustrates the above example. The impurity-containing silicon layer 551 is provided on a part of the head slider mounting surface (the top surface), inside the through-holes 539*a* and 539*b*, and the whole surface of the reverse side. FIGS. 10(*b*) and 10(*c*) show examples in which there is no through-hole 539*a* or 539*b*. If either one of the connection pads 545*a* and 545*b* to transmit signals to the piezoelectric element 252 is maintained at the ground potential, the insulating layer 552 under the metallic layer 254 may be formed by deposition, or an impurity-containing silicon layer 551 may be provided on the side surfaces of the silicon substrate 253 to join the top side and the reverse side of the silicon substrate 251. As shown in FIG. 10(*c*), the impurity-containing silicon layer 551 may be provided only on a part of the reverse side.

Figure 11:
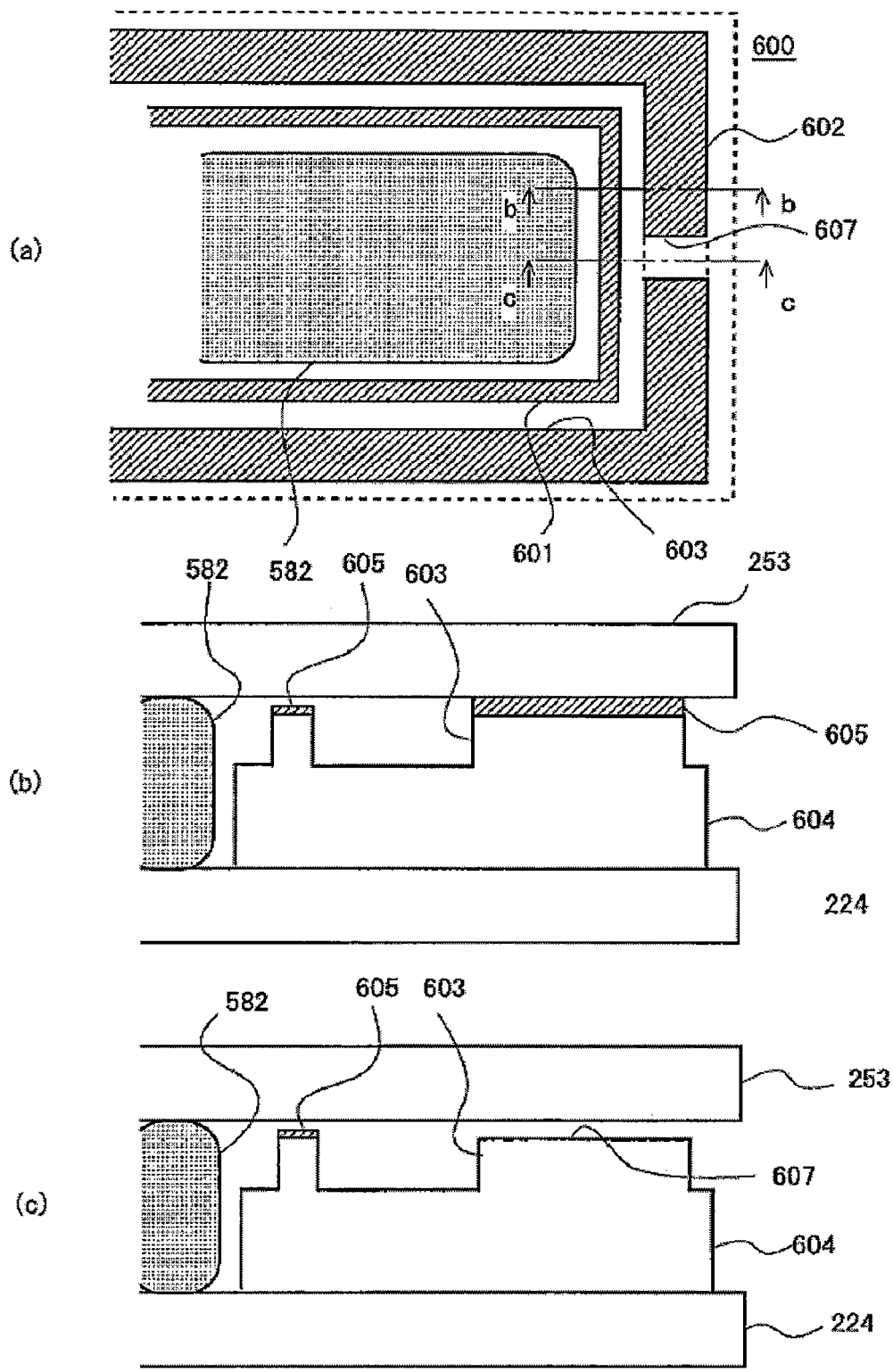
FIG. 11 are drawings schematically illustrating structures of conductive studs on the gimbal tongue according to an embodiment.

Next, referring to FIGS. 11(*a*) to 11(*c*), an example of a structure of a conductive stud on the gimbal tongue 224 will be described. FIG. 11 (*b*) is a cross-sectional view taken along the b-b section line in FIG. 11(*a*), and FIG. 11(*c*) is a cross-sectional view taken along the c-c section line in FIG. 11(*a*). A conductive stud 600 may have a double-wall structure as shown in FIG. 11(*a*). The conductive stud 600 comprises an inner wall 601 surrounding an adhesive 582 and an outer wall 602 surrounding the outside of the inner wall 601.

A groove 603 is provided between the inner wall 601 and the outer wall 602 as shown in FIG. 11(*b*). The outer wall 602 is higher than the inner wall 601. Therefore, the silicon substrate 253 contacts the outer wall 602 and there is a gap between the inner wall 601 and the silicon substrate 253. Such a structure may be desirable because the adhesive 582 may come between the inner wall 601 and the silicon substrate 253.

The conductive stud 600 comprises a copper layer 604 of a lower layer and a gold layer 605 of its upper layer. The copper layer 604 is a base of the conductive stud 600 and the gold layer 606 reduces the contact resistance with the silicon substrate 253. The groove 603 is provided in the copper layer 604. The drawing shows an example where the gold layer 605 is not provided inside the groove 603 but may be provided. Providing the copper layer 604 or the gold layer 605 with concavities and convexities leads to forming the inner wall 601, the outer wall 602, and the groove 603.

In manufacturing, the inner wall 601 functions to bank up the adhesive 582. The adhesive flowing out over the inner wall 601 pools in the groove 603. Therefore, it prevents the adhesive 583 from going into between the outer wall 602 and the silicon substrate 253 and as a result, it prevents the silicon substrate from being secured in its tilting state or the conductivity between the outer wall 602 and the silicon substrate 253 from being inhibited.

As shown in FIGS. 11(a) and 11(c), a ventilation opening 607 may be provided for ejecting the air inside the groove 603 in the outer wall 602. If air has been sealed in the groove 603 due to the adhesive 582, the air will expand with temperature change to apply force for peeling the silicon substrate 253 off the gimbal tongue 224. Therefore, the ventilation opening 607 is provided in the outer wall 602 so as not for the air to pool in the groove 603. Preferably, a plurality of ventilation openings 607 are provided in the outer wall 602. The ventilation opening 607 may be formed by removing (non-forming) a part of the gold layer 605 of the outer wall 602.

As set forth above, the present invention has been described by way of a particular embodiment, but is not limited to the above embodiment. A person skilled in the art may easily modify, add, or convert the components in the above embodiment within the scope of the substance of the present invention. For example, the present invention is particularly useful to an HDD but may be applied to other types of disk drive devices. The impurity-containing silicon layer may use a different element from the above example or may vary the content of the element. The double-wall stud on the gimbal tongue may be used in an HGA without a microactuator in which a head slider is directly bonded to the gimbal tongue.

What is claimed is:

1. A head gimbal assembly comprising:
a suspension;
a silicon substrate bonded to the suspension and having a movable part and a stationary part;
a piezoelectric element bonded to the silicon substrate;
a head slider bonded to the movable part;
a conductive path formed on the silicon substrate and having conductivity higher than the silicon substrate and for transmitting electric charge of the head slider; and
a conductive stud formed on the suspension and being in contact with the conductive path on a side of the suspension reverse to a head slider mounting surface on which the head slider is mounted.

2. The head gimbal assembly according to claim 1, wherein the conductive path comprises an impurity-containing silicon layer.

3. The head gimbal assembly according to claim 1, wherein the conductive path comprises a penetrating path extending from the head slider mounting surface to the reverse side through the silicon substrate.

4. The head gimbal assembly according to claim 3, wherein the silicon substrate comprises a through-hole; and the penetrating path penetrates the through-hole.

5. The head gimbal assembly according to claim 4, wherein the penetrating path comprises a metallic layer deposited inside the through-hole.

6. The head gimbal assembly according to claim 4, wherein the penetrating path comprises an impurity-containing silicon layer provided on the inner surface of the through-hole.

7. The head gimbal assembly according to claim 4, wherein the through-hole is provided in the stationary part.

8. The head gimbal assembly according to claim 2, wherein the conductive path comprises an impurity-containing silicon layer extending from the movable part to the stationary part on the slider mounting surface.

9. The head gimbal assembly according to claim 3, wherein the conductive path comprises an impurity-containing silicon layer extending and joining to the penetrating path on the slider mounting surface.

10. The head gimbal assembly according to claim 3, wherein
the silicon substrate comprises a plurality of through-holes; and
the conductive path comprises penetrating paths passing through the plurality of through-holes, respectively.

11. A microactuator comprising:
a silicon substrate having a stationary part to be bonded to a suspension and a movable part to be bonded to a head slider;
a piezoelectric element fixed on the silicon substrate for moving the movable part;
a conductive path formed on the silicon substrate, the conductive path having conductivity higher than the silicon substrate, and extending from a head slider mounting surface on which the head slider is mounted to the reverse side thereto.

12. A disk drive device comprising:
an enclosure;
a motor mounted in the enclosure for spinning a disk;
a head slider for accessing the disk; and
an actuator for supporting the head slider and moving the head slider over the disk in a radial direction thereof, wherein the actuator comprises,
a suspension having a conductive stud, and
a microactuator having a head slider mounting surface on which the head slider is mounted and fixed to the suspension in contact with the conductive stud on a side reverse to the head slider mounting surface, and the microactuator further comprises,
a silicon substrate including a movable part to which the head slider is bonded, and a stationary part bonded to the suspension in contact with the conductive stud;
a piezoelectric element bonded to the silicon substrate and for moving the movable part; and
a conductive path formed on the silicon substrate and having conductivity higher than the silicon substrate for transmitting electric charge of the head slider.

13. The disk drive device according to claim 12, wherein the conductive path comprises an impurity-containing silicon layer.

14. The disk drive device according to claim 12, wherein the conductive path comprises a penetrating path extending from the head slider mounting surface to the reverse side through the silicon substrate.

15. The disk drive device according to claim 14, wherein the silicon substrate comprises a through-hole; and
the penetrating path penetrates the through-hole.

16. The disk drive device according to claim 15, wherein the penetrating path comprises a metallic layer deposited inside the through-hole.

17. The disk drive device according to claim 15, wherein the penetrating path comprises an impurity-containing silicon layer provided on the inner surface of the through-hole.

18. The disk drive device according to claim 15, wherein the through-hole is provided in the stationary part.

19. The disk drive device according to claim 13, wherein the conductive path comprises an impurity-containing silicon layer extending from the movable part to the stationary part on the slider mounting surface.

20. The disk drive device assembly according to claim 14, wherein the conductive path comprises an impurity-containing silicon layer extending and joining to the penetrating path on the slider mounting surface.

* * * * *